(12) United States Patent
Helbing et al.

(10) Patent No.: US 7,974,842 B2
(45) Date of Patent: Jul. 5, 2011

(54) ALGORITHM FOR N-BEST ASR RESULT PROCESSING TO IMPROVE ACCURACY

(75) Inventors: Marc Helbing, Aachen (DE); Klaus Reifenrath, Hueckelhoven (DE)

(73) Assignee: Nuance Communications, Inc., Burlington, MA (US)

(*) Notice: Subject to any disclaimer, the term of this patent is extended or adjusted under 35 U.S.C. 154(b) by 322 days.

(21) Appl. No.: 11/418,928

(22) Filed: May 5, 2006

(65) Prior Publication Data

US 2007/0033025 A1   Feb. 8, 2007

Related U.S. Application Data

(60) Provisional application No. 60/677,928, filed on May 5, 2005.

(51) Int. Cl.
*G10L 15/04* (2006.01)
(52) U.S. Cl. ........................... 704/251; 704/257
(58) Field of Classification Search ................ 704/251, 704/257
See application file for complete search history.

(56) References Cited

U.S. PATENT DOCUMENTS

| | | | |
|---|---|---|---|
| 6,272,462 B1 * | 8/2001 | Nguyen et al. | 704/244 |
| 6,587,818 B2 * | 7/2003 | Kanevsky et al. | 704/251 |
| 7,158,935 B1 * | 1/2007 | Gorin et al. | 704/257 |
| 7,162,422 B1 * | 1/2007 | Bennett | 704/236 |
| 2002/0026456 A1 * | 2/2002 | Bradford | 707/500 |
| 2002/0198714 A1 * | 12/2002 | Zhou | 704/252 |
| 2003/0105634 A1 * | 6/2003 | Abella et al. | 704/257 |
| 2004/0210443 A1 * | 10/2004 | Kuhn et al. | 704/276 |
| 2004/0260543 A1 * | 12/2004 | Horowitz et al. | 704/221 |
| 2005/0033574 A1 * | 2/2005 | Kim et al. | 704/251 |
| 2005/0096913 A1 * | 5/2005 | Coffman et al. | 704/275 |
| 2005/0152511 A1 * | 7/2005 | Stubley | 379/88.01 |

* cited by examiner

*Primary Examiner* — Jakieda R Jackson
(74) *Attorney, Agent, or Firm* — Wolf, Greenfield & Sacks, P.C.

(57) ABSTRACT

A method of improving speech recognition includes receiving a plurality of recognized sentences from an automatic speech recognition (ASR) engine, each of the plurality of the recognized sentences including a plurality of information items. A confirmation is also receive that a value of an information item of the plurality of information items has been misrecognized or recognized. If the value has been misrecognized, each of the plurality of sentences are deleted that include the value of the information item that was misrecognized. If the value has been recognized, each of the plurality of sentences that do not include the value of the information item is deleted. The remaining sentences are transmitted to a dialog manager module.

17 Claims, 2 Drawing Sheets

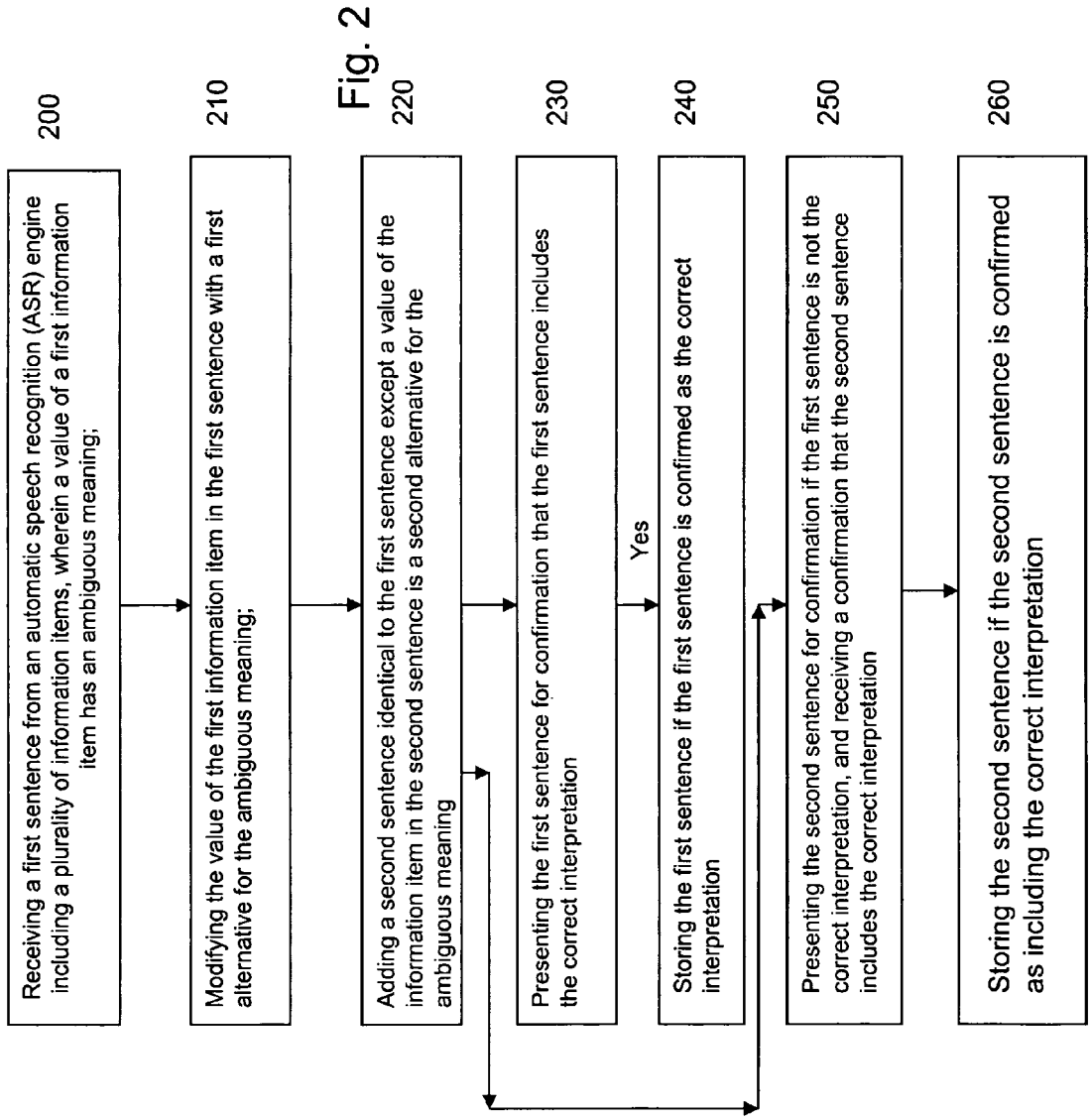

ALGORITHM FOR N-BEST ASR RESULT PROCESSING TO IMPROVE ACCURACY

RELATED APPLICATIONS

The present application claims priority under 35 U.S.C. § 119(e) to U.S. provisional patent application No. 60/677,928, filed on May 5, 2005, and entitled "Algorithm for N-Best ASR Result Processing to Improve Accuracy in Spoken Dialog System."

BACKGROUND OF THE INVENTION

1. Field of the Invention

Embodiments of the invention describe how a history of recognition result alternatives can be used to improve the performance of a spoken dialog system.

2. Background

There are known spoken computer-dialog systems in which a human caller talks to a computer (e.g., through a telephone or other audio enabled device). In such systems the computer is able to generate speech output, either as synthesized or prerecorded speech or a mixture of the two. The system may further feature an automatic speech recognition (ASR) engine, which analyzes sound data digitized from a caller's utterances. The ASR engine generates a speech recognition result, which contains an ordered list of alternative interpretations. Each interpretation consists of one or more information items. The speech recognition result is then passed to a dialog manager for further analysis, at the end of which the dialog manager generates a textual output suitable for speech output generation.

DEFINITIONS

Following is a list of definitions:

"Dialog Step" consists of an initial question (system prompt), the caller's reply, plus an optional confirmation question and the users reply to it. For example:
System: Where do you want to fly to?
Caller: London
System: I heard you say London, correct?
Caller: yes "Misrecognition" is the first best result interpretation, but does not contain any or all of the information items or does not contain the correct values for all or any of the information item, or only contains them with confidence values below a reasonable threshold.

SUMMARY OF THE INVENTION

It is quite often the case that if misrecognition occurs, the correct values for the required information items are contained in one of the other n-best interpretation alternatives. The problem is how to intelligently and consistently use this information in a way that is avoiding substantial code repetitions in every application.

In many of the existing spoken dialog systems, only the values of the first best values are processed. (e.g., in VoiceXML, HDDL). Some systems in the industry give the application code access to the n-best result The authors are not aware of any system that utilizes a framework component independent from the application to execute the n-best processing.

In this invention, the n-best results not only from the current dialog step but also from previous steps used, thus a dialog history is maintained to improve the overall dialog performance. Furthermore, during n-best processing a new algorithm is used to reject improbable alternatives. In addition, n-best processing is extended to cover ambiguous utterances, which are utterances that can be interpreted with different meanings. ("Frankfurt" could mean "Frankfurt am Main" or "Frankfurt an der Oder," "Sammy Davis" could mean "Sammy Davis, Sr" or "Sammy Davis, Jr").

BRIEF DESCRIPTION OF THE DRAWINGS

FIG. 2 illustrates a flowchart for improving voice recognition when phrases have ambiguous utterances according to an embodiment of the present invention.

DETAILED DESCRIPTION

Figure 1:
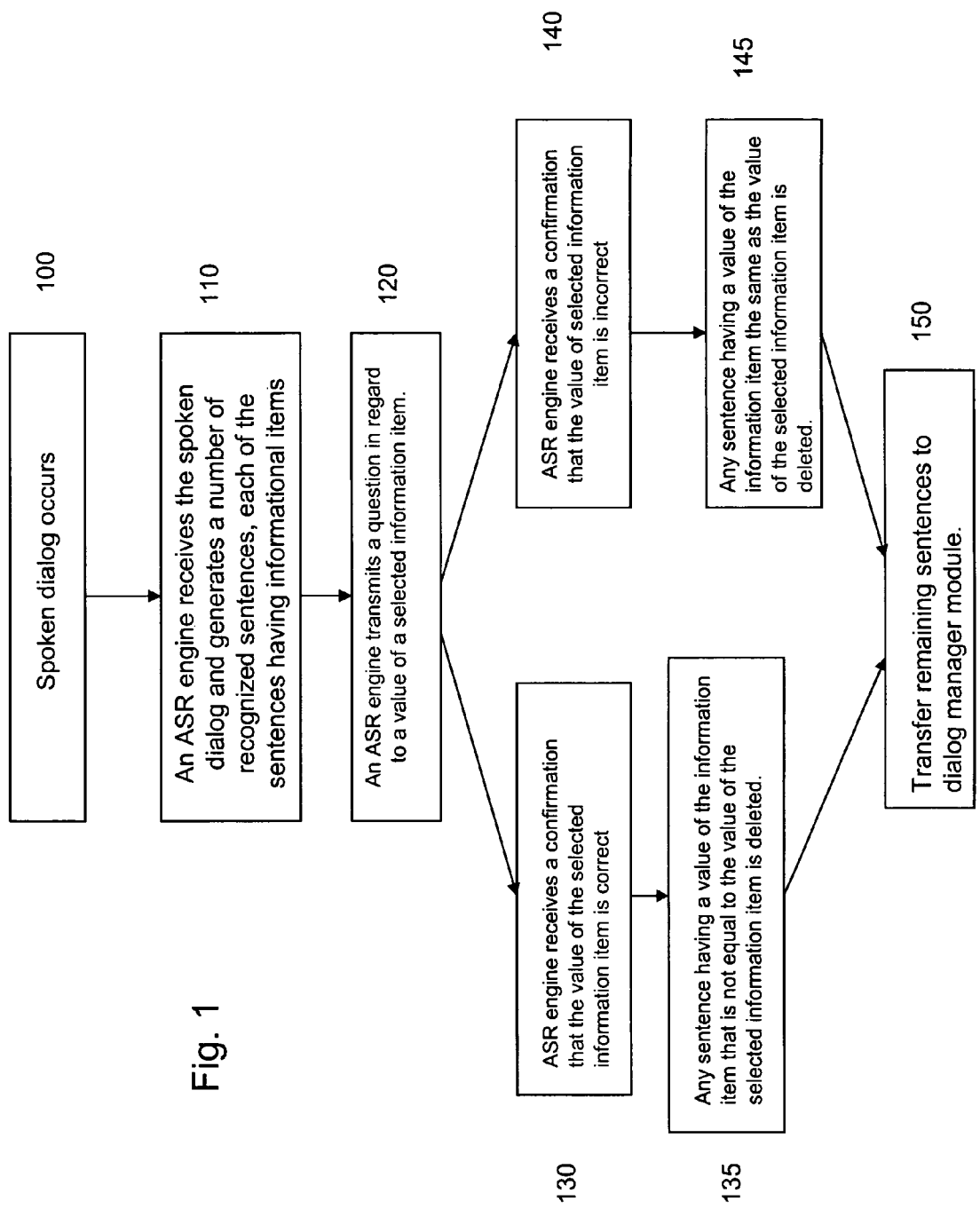
FIG. 1 illustrates a flowchart for improving an accuracy of speech recognition according to an embodiment of the invention.

The recognition result of an ASR engine may consist of n sentences, each consisting of m information items and an optional sentence confidence value. Both n and m range from 1 to some practical integer limit. Each information item is at least described by its value, optionally its description contains also a key, which is the name of the information item and a confidence, which is a measure of the ASR engine's belief in the correctness of the recognition, often a value between 0 and 1 where 1 denotes maximum belief.

In an embodiment of the invention there is provided an algorithm for second best retrieval. Second best retrieval is applied repeatedly in the case of rejections by the caller for n-best retrieval. N-best retrieval is limited either by the number of sentences present in the result or by a maximum repetition count. The user is presented with the best values of one or more of the information items recognized in an information question. The caller can either implicitly or explicitly confirm (a) or reject (b) one or several of the presented information items.

If the user confirms an information item, all sentences from the result are deleted which do not contain the same value as the best sentence for the confirmed item. Then the dialog continues as usual (i.e., it tries to confirm if other information items, if any, or new information is asked for, or if the already gathered information is processed in some arbitrary way, such as used to created a query for a database).

If the caller rejects an information item, all sentences from the result are deleted which contain the same rejected value.

In an embodiment, whole sentences are processed (deleted or retained) instead of only processing information items alone. The benefit of this algorithm stems from the fact that many speech recognition errors result from incorrect segmentation (the process of finding phoneme or word boundaries in a sentence). It is therefore most likely that if the ASR engine has failed to recognize a part of a sentence correctly, the adjacent part of the sentence will also not have been recognized correctly. Thus, statistically, better performance can be gained by discarding complete sentences instead of only single words.

Such algorithm may be used above in a reusable software component. One embodiment of such a component can be a class from an object-oriented programming language. The reusable component covers the processing of the result structure and exposes an interface to its client which at the least comprises the following methods:

(a) a method to reject the value of an information item; this method at least has one parameter, which is the name of the information item;

(b) a method to confirm the value of an information item; this method at least has one parameter which is the name of the information item.

An important extension of the above algorithms is their application to ASR results from previous dialog steps. Therefore, history of ASR results may be stored. Potential use cases among others are the execution of a confirmation in more than one turn together with corrections as illustrated in the following example:

Example 1

System: How can I help you?
Caller: I want to fly from Saratoga to Boston tomorrow
[ASR result stored:
0 origin: St. Paul, destination: Charleston, day tomorrow
1 origin: Saratoga, destination: Boston, day: tomorrow]
System: Fly tomorrow to Charleston, correct?
Caller: No, not to Charleston!
[ASR Result for last contribution to destination is retrieved and all sentences with origin=Charleston are removed.]
System: Fly from Saratoga to Boston, correct?
Caller: yes.

Keeping the results of all recognition during the dialog allows callers to correct previous misrecognition at any time in the dialog, not only on subsequent turns and moreover the correction can benefit from the algorithm described above.

The algorithm(s) described above may be used for the processing of ambiguous results. An ambiguous result is an ASR result that contains more than one meaning for the whole or a part of the caller's utterance. The n-best retrieval capabilities of the algorithms described above may be used to automatically clarify ambiguities. A processing block may be used to expand all sentence interpretations containing ambiguous result into two or more interpretations that contain only unambiguous results. This processing can occur in the ASR engine itself, in the component that implements the n-best algorithm or in some other component.

After the result is expanded, the n-best algorithm above may be applied as usual (e.g., if the caller rejects the first of a number of alternatives for an ambiguous information item, the algorithm will automatically retrieve the next best sentence) which, due to the expansion, contains another alternative for the same information item.

Example 2

System: Where do you want to go?
Caller: I want to leave today for London come back at the weekend.
[Immediate ASR result:
0: departure day: today, destination: London, return day: weekend
After expansion:
0: departure day: today, destination: London, return day: Saturday
0: departure day: today, destination: London, return day: Sunday
System: So you want to travel today to London and return on Saturday?
Caller: No
System: So you want to travel today to London and return on Sunday?
Caller: Yes, exactly.

FIG. 1 illustrates a flowchart for improving an accuracy of speech recognition according to an embodiment of the invention. In this embodiment of the invention, a caller or individual speaks 100 an utterance or dialog into a speech recognition system. An Automatic Speech Recognition (ASR) engine receives the spoken dialog and generates 110 a number of recognized sentences. Each of the sentences may include a plurality of informational items.

In response to the receipt of the spoken dialog, the ASR engine may transmit 120 a question to a user in regard to a value of a selected information item. The question may be designed to identify whether the value is accurate. In an embodiment of the invention, an ASR engine receives 130 a confirmation that the value of the selected information item is correct. In an embodiment of the invention, any of the plurality of sentences that have a value of the information item which is not equal to the value of the selected information item may be deleted from storage 135 or moved to a different location.

In an embodiment of the invention, the ASR engine receives 140 a confirmation that the value of selected information item is incorrect. In other words, the ASR engine identifies that a misrecognition has occurred. In this embodiment of the invention, the ASR engine may delete 145 any sentence having a value of the information item that is the same as the value of the misrecognized information item. A number of recognized sentences is left after the sentences have been deleted. The remaining recognized sentences are then transferred 150 to a dialog manager software module.

FIG. 2 illustrates a flowchart for improving voice recognition when phrases have ambiguous utterances according to an embodiment of the present invention. In an embodiment of the invention, a first sentence is received 200 from an automatic speech recognition (ASR) engine. The first sentence includes a plurality of information items, wherein a value of a first information item has an ambiguous meaning. For example, weekend may mean Saturday or Sunday.

In this embodiment of the invention, the value of the first information item is modified 210 in the first sentence to include a first alternative for the ambiguous meaning. For example, the value of "weekend" may be replaced or modified with the term "Saturday." A second sentence is added 220 that is identical to the first sentence except a value of the information item in the second sentence is a second alternative for the ambiguous meaning. Illustratively, the second value for "weekend" is Sunday.

In an embodiment of the invention, the first sentence is presented 230 for confirmation that the first sentence includes the correct interpretation for the value of the first information item. In other words, in an embodiment of the invention, the whole sentence is presented to the user with a first alternative for the term with the ambiguous meaning. If the first sentence is confirmed, then the first sentence is stored 240 as the correct interpretation for the information item and thus the sentence.

In an embodiment of the invention, if the first sentence is not confirmed, then the second sentence is presented 250 for confirmation that the second sentence includes the correct interpretation for the value of the information item. If the second sentence is confirmed as including the correct interpretation, the second sentence is stored 260 in a storage or memory.

The present invention described above references flowchart illustrations of methods, apparatus, and computer program products. It will be understood that each block of the flowchart illustrations, and combinations of blocks in the flowchart illustrations, can be implemented by computer program instructions (as can any menu screens described in the Figures). These computer program instructions may be loaded onto a computer or other programmable data processing apparatus to produce a machine, such that the instructions which execute on the computer or other programmable data processing apparatus create instructions for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks, and/or menus presented herein.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

The invention claimed is:

1. A method of performing speech recognition, comprising:
   generating, for a given speech input from a user, a plurality of recognized sentences from an automatic speech recognition (ASR) engine executing on a data processing apparatus, using an n-best retrieval algorithm, each of the plurality of recognized sentences including a plurality of information items, each of the plurality of information items having a value, the plurality of recognized sentences comprising a plurality of alternative recognitions of the given speech input;
   prompting the user to indicate whether a value of at least one information item of a first recognized sentence of the plurality of recognized sentences has been misrecognized;
   receiving an indication from the user that the value of the at least one information item, but less than all the information items, of the first recognized sentence of the plurality of recognized sentences has been misrecognized; and
   eliminating each of the plurality of recognized sentences that includes the value of the at least one information item that was misrecognized, resulting in a remaining plurality of recognized sentences.

2. The method of claim 1, further including transferring the remaining plurality of recognized sentences to a dialog manager module.

3. The method of claim 1, wherein at least one of the plurality of recognized sentences includes a confidence value identifying a degree of confidence the ASR engine has that the at least one of the plurality of recognized sentences is an accurate recognition of the given speech input.

4. The method of claim 1, wherein eliminating each of the plurality of recognized sentences that includes the value of the at least one information item that was misrecognized comprises eliminating at least two recognized sentences of the plurality of recognized sentences.

5. A method of performing speech recognition, comprising:
   generating, for a given speech input from a user, a plurality of recognized sentences from an automatic speech recognition (ASR) engine executing on a data processing apparatus, using an n-best retrieval algorithm, each of the plurality of recognized sentences including a plurality of information items, each of the plurality of information items having a value, the plurality of recognized sentences comprising a plurality of alternative recognitions of the given speech input;
   prompting the user to indicate whether a value of at least one information item of a first recognized sentence of the plurality of recognized sentences has been accurately recognized;
   receiving an indication from the user that the value of the at least one information item, but less than all the information items, of the first recognized sentence of the plurality of recognized sentences has been accurately recognized; and
   eliminating each of the plurality of recognized sentences that does not include the value of the at least one information item that was accurately recognized, resulting in a decreased number of sentences.

6. The method of claim 5, further including transferring the decreased number of sentences to a dialog manager module.

7. The method of claim 5, wherein at least one of the plurality of recognized sentences includes a confidence value identifying a degree of confidence the ASR engine has that the at least one of the plurality of recognized sentences is an accurate recognition of the given speech input.

8. The method of claim 5, wherein eliminating each of the plurality of recognized sentences that does not include the value of the at least one information item that was accurately recognized comprises eliminating at least two recognized sentences of the plurality of recognized sentences.

9. A method of performing speech recognition in a dialog session, comprising:
   generating, for a given speech input from a user, a plurality of recognized sentences from an automatic speech recognition (ASR) engine, using an n-best retrieval algorithm, each of the plurality of recognized sentences including a plurality of information items, each of the plurality of information items having a value, the plurality of recognized sentences comprising a plurality of alternative recognitions of the given speech input;
   storing the plurality of recognized sentences in storage;
   requesting of the user an indication whether a value of at least one information item of a first recognized sentence of the plurality of recognized sentences was accurately recognized;
   receiving an indication from the user that the value of the at least one information item, but less than all the information items, of the first recognized sentence was accurately recognized; and
   removing any recognized sentences from the storage that do not include the value of the at least one information item of the first recognized sentence to create remaining recognized sentences.

10. The method of claim 9, further including transmitting the remaining recognized sentences to a dialog manager module.

11. The method of claim 9, wherein each information item of the plurality of information items of the first recognized sentence includes a recognized value and a confidence, the confidence being a measure of a degree of confidence the ASR has of correctness of the recognized value of the information item.

12. The method of claim 9, wherein removing any recognized sentences that do not include the value of the at least one information item of the first recognized sentence comprises removing at least two recognized sentences of the plurality of recognized sentences.

13. A method of clarifying ambiguous utterances in a dialog session, comprising:
    receiving a first sentence from an automatic speech recognition (ASR) engine executing on a data processing apparatus, the first sentence comprising a recognition of a spoken input provided to the ASR, the first sentence including a plurality of information items, each information item of the plurality of information items having a value, wherein a value of a first information item of the plurality of information items has an ambiguous meaning for which there are two or more equally correct meanings;
    modifying the value of the first information item in the first sentence to take a first alternative value for the ambiguous meaning; and
    generating a second sentence identical to the first sentence except for the value of the first information item, wherein the value of the first information item in the second sentence is a second alternative value for the ambiguous meaning.

14. The method of claim 13, further including presenting the first sentence to a user for an indication of whether the first alternative value accurately reflects an intended value of the user for the first information item.

15. The method of claim 14, further including storing the first sentence if the first alternative value is confirmed by the user as being the intended value for the first information item.

16. The method of claim 13, further including presenting the first sentence to a user for an indication of whether the first alternative value accurately reflects an intended value of the user for the first information item, receiving a rejection from the user of the first alternative value, and presenting the second sentence to the user for an indication of whether the second alternative value accurately reflects the intended value of the user for the first information item.

17. The method of claim 16, further including storing the second sentence if the second alternative value is confirmed by the user as being the intended value for the first information item.

* * * * *